United States Patent
Krikorian et al.

(10) Patent No.: US 6,853,330 B1
(45) Date of Patent: Feb. 8, 2005

(54) INVERSE PRECISION VELOCITY UPDATE FOR MONOPULSE CALIBRATION

(75) Inventors: Kapriel V. Krikorian, Calabasas, CA (US); Robert A. Rosen, Simi Valley, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/845,884

(22) Filed: May 13, 2004

(51) Int. Cl.$^7$ .................. G01S 13/44; G01S 13/90; G01S 7/40
(52) U.S. Cl. ............... 342/149; 342/25 R; 342/25 A; 342/25 C; 342/73; 342/74; 342/75; 342/80; 342/165; 342/173; 342/175; 342/176; 342/179; 342/190; 342/191; 342/195
(58) Field of Search .................. 342/25 R–25 F, 342/61–65, 73–75, 80, 368–384, 147, 149–154, 165–176, 179, 190–197

(56) References Cited

U.S. PATENT DOCUMENTS

| | | | |
|---|---|---|---|
| 4,978,960 A | * 12/1990 | Newcomb et al. | ........ 342/25 R |
| 4,978,961 A | * 12/1990 | Williams et al. | ......... 342/25 R |
| 5,334,980 A | * 8/1994 | Decker | ...................... 342/25 R |
| 5,489,907 A | * 2/1996 | Zink et al. | ................. 342/25 R |
| 5,742,250 A | * 4/1998 | Krikorian et al. | ......... 342/25 R |
| 6,741,202 B1 | * 5/2004 | Krikorian et al. | ......... 342/25 R |

* cited by examiner

*Primary Examiner*—Bernarr E. Gregory
(74) *Attorney, Agent, or Firm*—Leonard A. Alkov; Karl A. Vick

(57) ABSTRACT

A radar system derives a correction for an actual boresight (311) of a radar monopulse antenna mounted on a moving platform from Σ data and Δ data generated with respect to an a priori known, calibrated boresight (309). The monopulse antenna (602) is coupled to a ground position measuring system (616) while acquiring data. The radar receiver acquires a Σ and Δ synthetic aperture map of the same radar scattering location with respect to the calibrated boresight. Σ SAR data and the Δ SAR data are motion compensated using the position and velocity supplied by the ground positioning system. A computer forms a ratio of the aligned Δ pixels to the aligned Σ pixels for each of a plurality of aligned Σ pixels located near the calibrated boresight. The correction for the location of the actual boresight of the monopulse antenna is computed by an analysis of the ratio of aligned Σ pixels and corresponding aligned Δ pixels over the radar scattering location. Typically, a least square fit analysis is used to plot the Δ/Σ ratio, and ascertain where the zero crossing of the monopulse angle=0 line is found thereby identifying the position of the actual boresight, and the correction from the a priori, calibrated boresight.

12 Claims, 6 Drawing Sheets

FIG 2 - PRIOR ART

INVERSE PRECISION VELOCITY UPDATE FOR MONOPULSE CALIBRATION

BACKGROUND OF THE INVENTION

1. Field of Invention

This invention is in the field of radar antenna boresight orientation.

2. Description of the Related Art

An important function of a radar system, whether a Real Beam type, Synthetic Aperture (SAR) or Interferometric SAR is to detect a target as well as identify it. Radar target detection and identification have been proven necessary in military surveillance, reconnaissance, and combat missions. The detection and identification of targets provide real-time assessment of the number and the locations of targets of interest.

One method of target detection and identification is to process the image acquired by the radar using, for example, Synthetic Aperture Radar (SAR) technology. By processing a SAR generated image, the features of a target can be extracted and matched to a database for identification.

The general principle behind SAR is to obtain high resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

High resolution SAR maps are obtained by coherently combining return signals reflected from transmitted pulses in the cross range direction from radar platform movement. However, formation of focused SAR images or maps requires accurate information on platform position and velocity to shift and focus the received radar returns over the duration of the image acquisition time, the array length, so as to have a useful, phase adjusted combination of pulse returns from multiple pulses transmitted at different times from different radar positions. The process of aligning pulses in time and space for coherent integration is referred to as motion compensation, and is usually performed with the raw radar data, at the early stage of the image formation process.

The SAR process becomes more intricate for moving targets. In order to locate moving targets precisely in range and azimuth with a single radar, accurate angle measurements using the monopulse capability of the SAR antenna need to be performed. That is, the target location needs to be determined with respect to the actual boresight of the radar antenna performing the angle measurement from boresight to the target. The accuracy of these angle measurements is often limited by bias errors internal to the radar which are not related to the signal to noise ratio of the received radar return. In effect, the bias errors preclude accurate monopulse angle measurement to a target, even if the target is clearly visible by the radar.

One cause of these bias errors is the presence of the radome in the path of both the transmitted and the received radar signal. The radome acts as a lens at the radar frequencies, thus bending the signals that pass through it. This lens is typically not constant over the extent of the radome, and the area swept by the radar transmit/receive function.

Another cause of bias errors comes from imbalances in the antenna/receiver system. A monopulse is formed from the Sum and Difference channel. However, because of channel imbalance, the gain of these channels changes as a function of elevation/azimuth. Thus, an angle error arises during the actual angle measurement, restricting the accuracy of the monopulse.

One approach of the prior art to remove these bias errors corrupting monopulse angle measurements related to radome uncertainty and channel imbalances is to conduct exhaustive calibration procedures to map these bias errors. The errors and associated corrections are accounted for separately, typically in a table. For example, the precise, a prior known, calibrated angle corrections are stored in an elevation/azimuth table, and actual measurements are corrected using entries in the elevation/azimuth table. The measurements needed to compile the entries in the monopulse error correcting table are both expensive and of limited accuracy. The error table can become inaccurate because channel imbalance can change as a normal part of radar operation, receiver/transmitter element aging and the like. This inaccuracy limits the angle measuring capabilities of the monopulse.

SUMMARY OF THE INVENTION

The present invention avoids the limitations of the prior art by a radar system deriving a correction for an actual boresight of a radar monopulse antenna mounted on a moving platform from $\Sigma$ data and $\Delta$ data generated with respect to a calibrated boresight of the monopulse antenna. The $\Sigma$ data is generated from a $\Sigma$ channel, while the $\Delta$ data is generated from a $\Delta$ channel. The monopulse antenna is coupled to a ground position measuring system while acquiring data. The ground positioning measuring system reports a position and velocity of the monopulse antenna with respect to a reference.

The radar receiver acquires a $\Sigma$ synthetic aperture map of a radar scattering location using the $\Sigma$ channel of the monopulse antenna, and a $\Delta$ synthetic aperture map of the same radar scattering location using the $\Delta$ channel of the monopulse antenna. Both, the $\Sigma$ synthetic aperture map and the $\Delta$ synthetic aperture map are acquired with respect to the calibrated boresight. The $\Sigma$ synthetic aperture map is formed from a plurality of $\Sigma$ data, while the $\Delta$ synthetic aperture map formed from a plurality of $\Delta$ data.

A motion compensator using the ground position measuring system motion compensates the $\Sigma$ data with respect to the reference and said $\Delta$ data with respect to the same reference using the position and velocity to obtain aligned $\Sigma$ pixels and aligned $\Delta$ pixels.

A computer forms a ratio of the aligned $\Delta$ pixels to the aligned $\Sigma$ pixels for each of a plurality of aligned $\Sigma$ pixels located near the calibrated boresight. The computer also computes the correction for the location of the actual boresight of the monopulse antenna by an analysis of the ratio for a plurality of aligned $\Sigma$ pixels and corresponding aligned $\Delta$ pixels over the radar scattering location.

Typically, a least square fit analysis is used to find a line that best fits the $\Delta/\Sigma$ ratio for the plurality of pixels in the vicinity of the calibrated boresight. This fitted line ascertains where the zero crossing of the Monopulse angle=0 line is found, thereby identifying the position of the actual boresight. When the position of the actual boresight is compared with that of the a priori, calibrated boresight, an error is generated that is used to correct future monopulse acquired data.

DETAILED DESCRIPTION

The present invention describes an apparatus and method of removing bias an radome errors associated with monopulse measurements that reduces the need for a monopulse angle calibration table by using SAR imagery to estimate elevation and azimuth angle errors directly.

Figure 1:
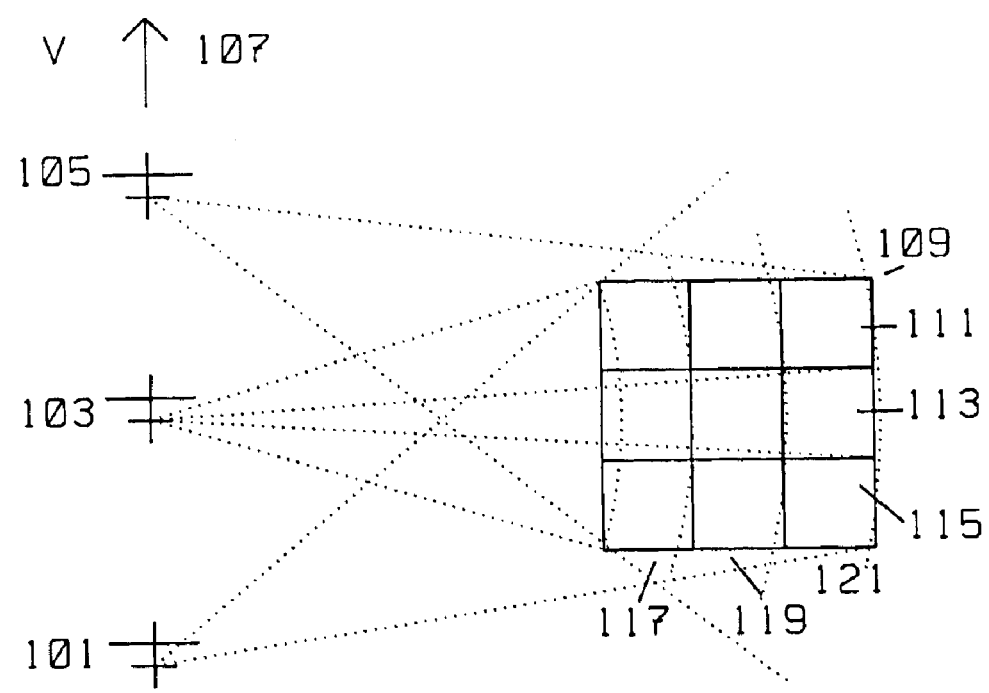
FIG. 1 is a sample configuration of the prior art showing the acquisition of a radar image containing a target using SAR methods.

FIG. 1, the prior art, shows a simplified, typical geometric relationship between a moving platform carrying a radar transmitter/receiver using Synthetic Aperture (SAR) methods and target area 109 to be imaged by said radar transmitter/receiver. The moving platform is initially at position 101, travels with velocity V in the direction 107. The moving platform moves from position 101 to position 103, and then to position 105 along a path in direction 107. Imaging pulses are transmitted and received at each position 101, position 103 and position 105. At position 103 for example, the target area 109 to be imaged falls within range bins 117, 119, and 121. In azimuth, target area 109 falls within azimuth positions 111, 113 and 115. The range bin/azimuth positions at this position 103 are most favorable as they most closely correspond to the square nature of target area 109 and subdivisions thereof. The simple example of a 3 by 3 matrix of range bins/azimuth positions is illustrative of the raw data used by the present invention for target acquisition and identification using SAR methods. Typically, a target is contained within a plurality of range bins/azimuth positions, where the plurality of range bins/azimuth positions are part of a larger image rendered by the radar system.

Figure 2:
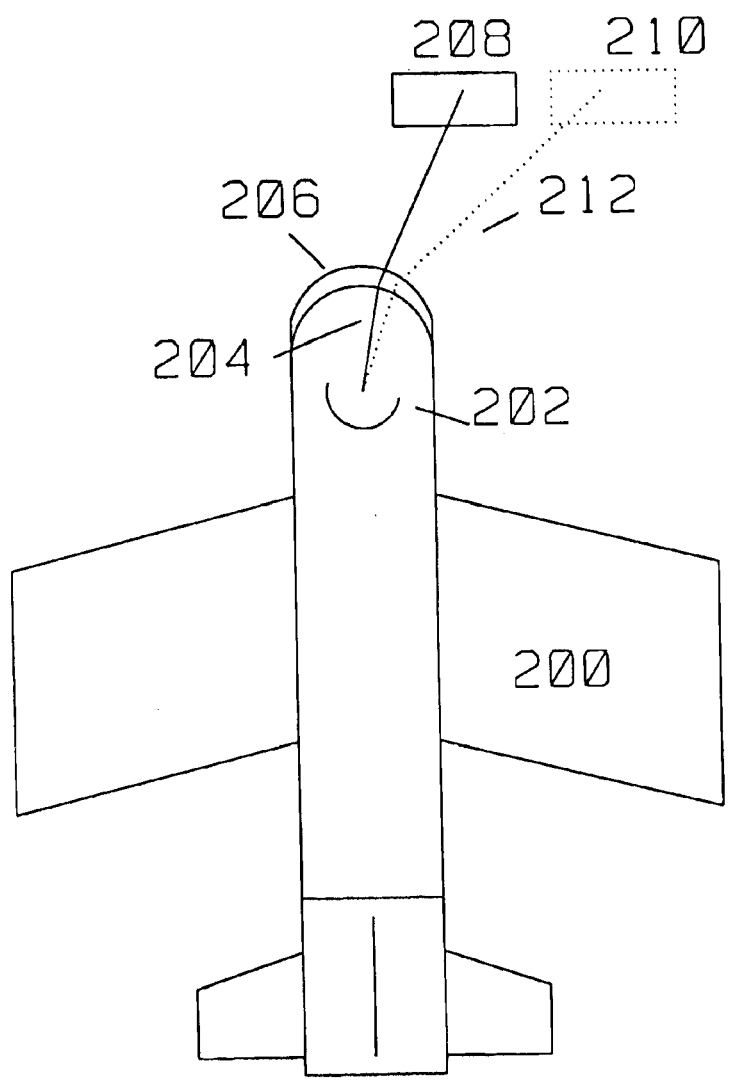
FIG. 2 is an exemplary configuration of the prior art where a radome introduces bias errors into the transmitted and received signal of a radar monopulse measurement.

FIG. 2 shows a typical source of error related to the actual position of the boresight in a monopulse measurement as compared to a calibrated, a priori known boresight position. Moving platform 200 carries monopulse radar antenna 202. Antenna 202 transmits beam 204. Beam 204 is bent by radome 206 to reach target 208. In turn target 208 reflects some of the energy from beam 204 back into antenna 202, following generally a path through radome 206. Thus the radar energy sees the radar energy bending, lens effect of radome 206 for both the transmit as well as the receive path. The path followed beam 204 through radome 206 and reaching target 208 is a calibrated path, corrected for a prior known radome distortion, channel imbalance and other variables affecting the position of the boresight of antenna 202. In contrast, the actual path of beam 204 is described by actual beam 212, illuminating an actual target 210, slightly displaced from (calibrated) target 208. Thus, radar 202 believes it is imaging target 208, when in fact it is imaging target 210. It is the determination of actual path 212 as compared to a prior known, calibrated path 204 with respect to platform 200 that is the subject of this application.

Figure 3:
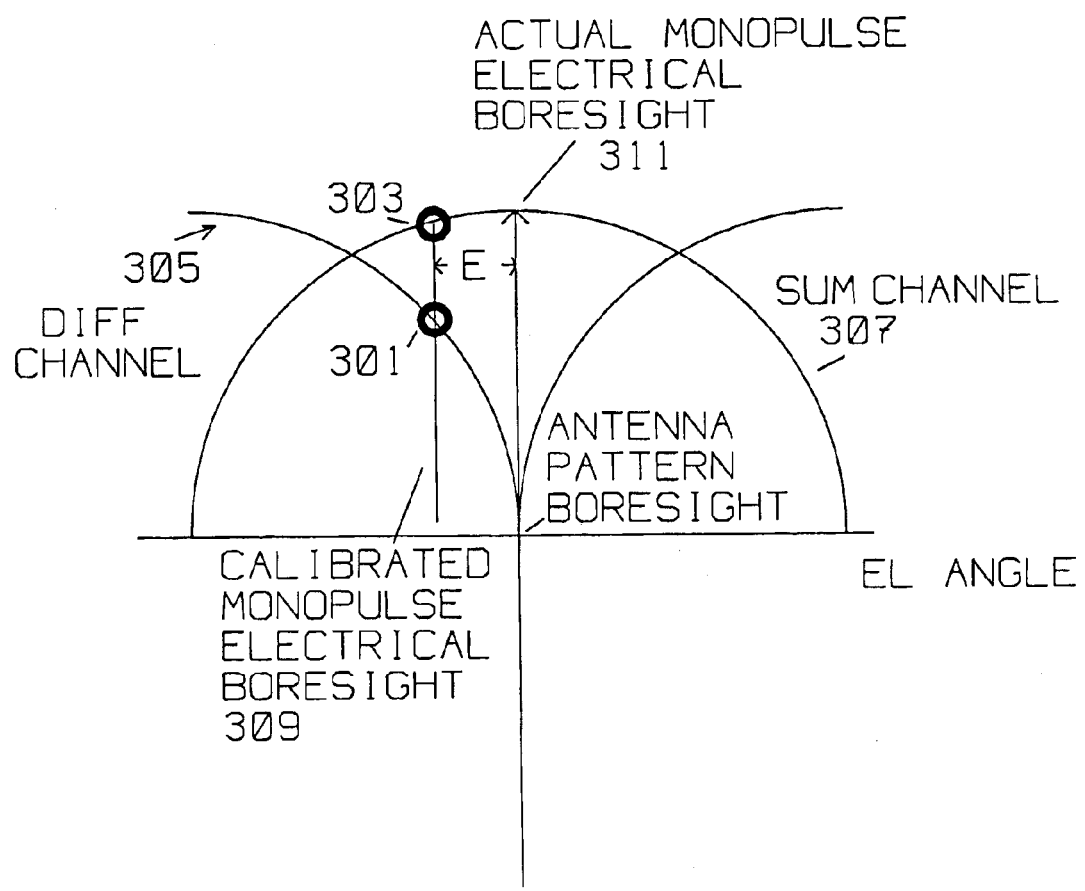
FIG. 3 is a monopulse diagram showing a priori, calibrated boresight position and the error with respect to an actual boresight position.

FIG. 3 shows a prior art monopulse measurement formed from the SUM Channel 307 and Difference Channel 305 of a SAR antenna, for example, in elevation. A target is seen by the Difference Channel 305 at position 301. The same target is seen by SUM Channel 307 at position 303. The Difference channel 305 has a minimum output at the electrical boresight while the SUM channel has a maximum output. Forming the ratio of SUM channel 307 and Difference channel 305 for a particular range bin and target within that range bin allows a first order determination of the relative elevation angle of the target with respect to the SAR antenna. However, because of balance and radome errors associated with the monopulse antenna, the boresight if the monopulse may be mistakenly positioned. Here, the target corresponding to SUM ($\Sigma$) channel target 303 and Difference channel target 301 are erroneously believed to be on the calibrated, a prior known monopulse electrical boresight 309. In reality, the actual monopulse boresight 311 is located an amount E away. E is the error of boresight location.

Figure 4:
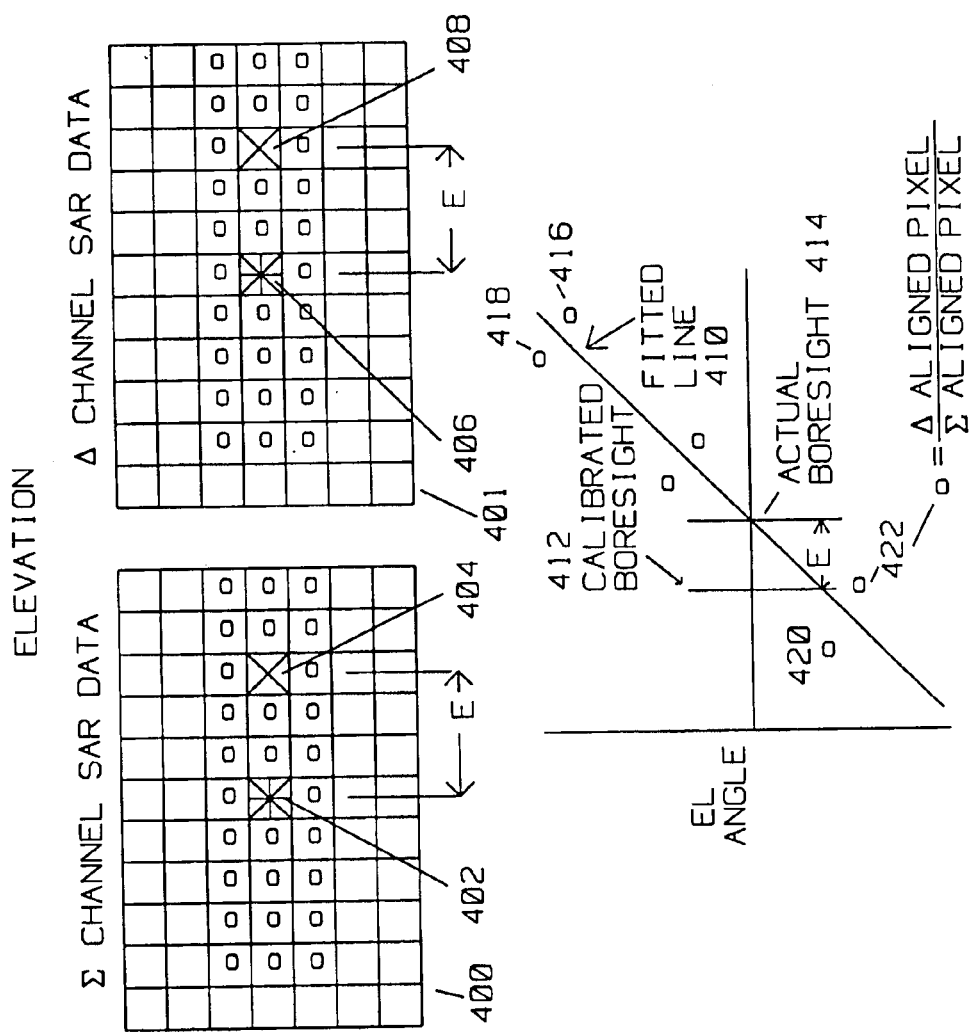
FIG. 4 is a diagram of the $\Sigma$ and $\Delta$ maps used to estimate the position of the actual boresight.
Figure 5:
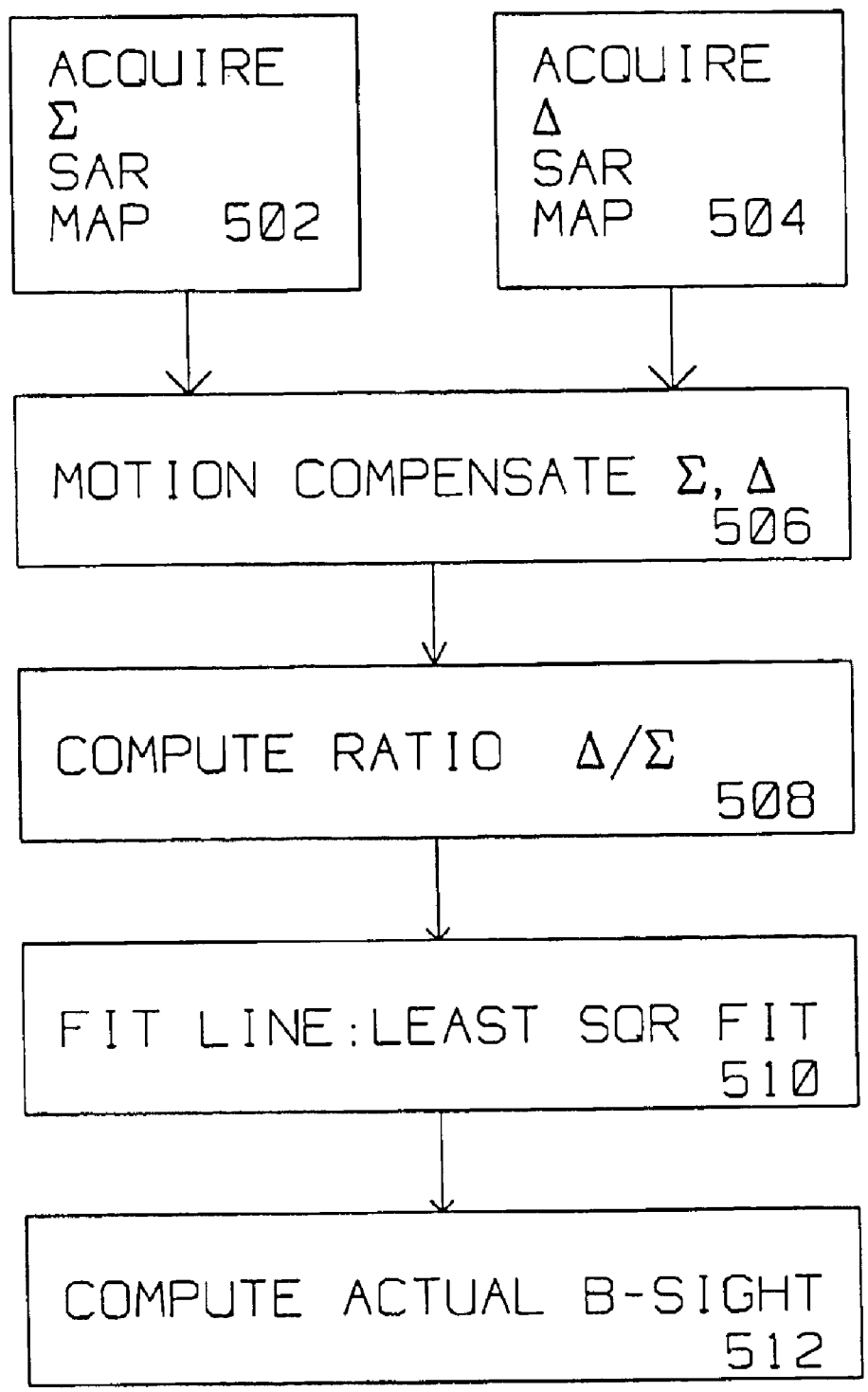
FIG. 5 is a software flow diagram of the method of this invention.

FIG. 4 and FIG. 5 show the method of the invention for estimating an actual boresight 414 of an elevation oriented radar monopulse antenna mounted on a moving platform from $\Sigma$ data and $\Delta$ data generated with respect to an a priori known, calibrated boresight 412 of the monopulse antenna. SAR $\Sigma$ data is generated from the monopulse $\Sigma$ channel in Acquire $\Sigma$ SAR map 502. A data generated from the monopulse a $\Delta$ channel in Acquire $\Delta$ SAR map 504. The phase center of the monopulse antenna is coupled to a ground position measuring system comprising an inertial navigation and a satellite based ground positioning system (GPS). A GPS typically uses a constellation of geo-orbital satellites to provide locating signals to the GPS system. The inertial navigation system, part of the moving platform, in conjunction with the GPS, comprising the ground positioning measuring system, reports the position of the monopulse antenna with respect to a reference as well as the velocity with respect to the same reference for motion compensating the SAR maps in motion compensate $\Sigma$, $\Delta$ 506. The determination of error E between the a priori, calibrated boresight location 402 and the actual boresight location 404 in accordance with this invention therefore comprises the steps of:

a) Acquiring a $\Sigma$ synthetic aperture map 400 of a radar scattering location, such as, for example a ground target, or ground patch 208, using the $\Sigma$ channel of the monopulse antenna. SAR map 400 is centered with respect to the calibrated boresight 402, that is, the radar scattering location is centered about the calibrated boresight. The $\Sigma$ synthetic aperture map 400 is formed from a plurality of $\Sigma$ data elements.

b) Acquiring a $\Delta$ synthetic aperture map 401 of said radar scattering location using the $\Delta$ channel of the monopulse antenna with respect to the calibrated boresight location 406. SAR map 401 is centered with respect to the calibrated boresight location 406. A synthetic aperture map 401 is formed from a plurality of $\Delta$ data. Centers 402 and 406 correspond in space, that is $\Sigma$ map 401 and $\Delta$ map 401 data register as they depict the exact same radar scattering location.

c) Motion compensate the $\Sigma$ data (map 400) with respect to the reference using the position and velocity inputs from the GPS/INS system to obtain aligned $\Sigma$ pixels.

d) Motion compensate the $\Delta$ data (map 401) with respect to the reference using the position and velocity inputs from the GPS/INS system to obtain aligned $\Delta$ pixels.

Note that each of the aligned Δ pixels are matched to corresponding aligned Σ pixels obtained from the same radar scattering location.

e) form the ratio of aligned Δ pixels to said aligned Σ pixels, for each of a plurality of said aligned Σ pixels located near said calibrated boresight. That is, compute ratio Δ/Σ 508 performs $$\text{Ratio} = \frac{\Delta}{\Sigma}$$

for similarly located, corresponding pixels in map 400 and map 401.

Since it is known that the a priori, calibrated boresight is not far removed from the actual boresight, not all pixels of maps 400 and 401 need be tested. Generally, for a 512 by 512 SAR map, only about a 20 by 20 pixel area around the calibrated boresight 402 are compared.

f) Identifying the actual boresight of the monopulse antenna by an analysis of the ratio for each pixel obtained in (e) above. The analysis is performed for a plurality of aligned Σ pixels and corresponding aligned Δ pixels over said radar scattering location.

The analysis of the ratio is, in one example, a least square fit of the plurality of aligned Σ pixels around the calibrated boresight, as computed in Fit Line: Least square fit 510. For example, data points representative of the Δ/Σ ratio, such as 420 and 422, 418 and 416, will define a fitted line 410. Where fitted line 410 crosses the zero axis, is the location of the actual boresight 414. This will typically be an E away from the location of the a priori known, calibrated boresight 412. The computation of the location of the actual boresight is performed in Compute Actual Boresight 512.

In another example, should least square fit pose too much of a computing burden, a straight line fit using data points 420, 422, 416, and 418 can also be used. The principle remains the same. The actual boresight location is defined where the fitted line to the data points crosses the 0 monopulse angle axis, i.e.

$$\Delta/\Sigma = 0$$

For this method to work, the ground position measuring system (INS plus GPS) provides velocity updates with an accuracy between 1 and 10 millimeters per second. The velocity is integrated over time for reporting the position with respect to the reference for motion compensating the Σ data and said Δ data. Typically such accuracy is obtained from phase information contained in the GPS satellite signals.

With high position accuracy for the SAR motion compensation, the monopulse angle estimation of the actual boresight location is limited by the signal to noise ratio as most bias errors are reduced or eliminated. Thus, the monopulse correction error will approach:

$$\sigma_c = \frac{\text{Beam Width}}{\sqrt{\text{Clutter to noise ratio} \cdot \text{Number of pixels}}}$$

The GMT target angle error will approach:

$$\sigma_t = \frac{\text{Beam Width}}{\sqrt{2 \cdot SNR \cdot NPDI}}$$

where:
Beam Width is the number of degrees (radians) of beamwidth of the monopulse antenna;

SNR is signal to noise ratio

NPDI is number of post detection integration.

Figure 6:
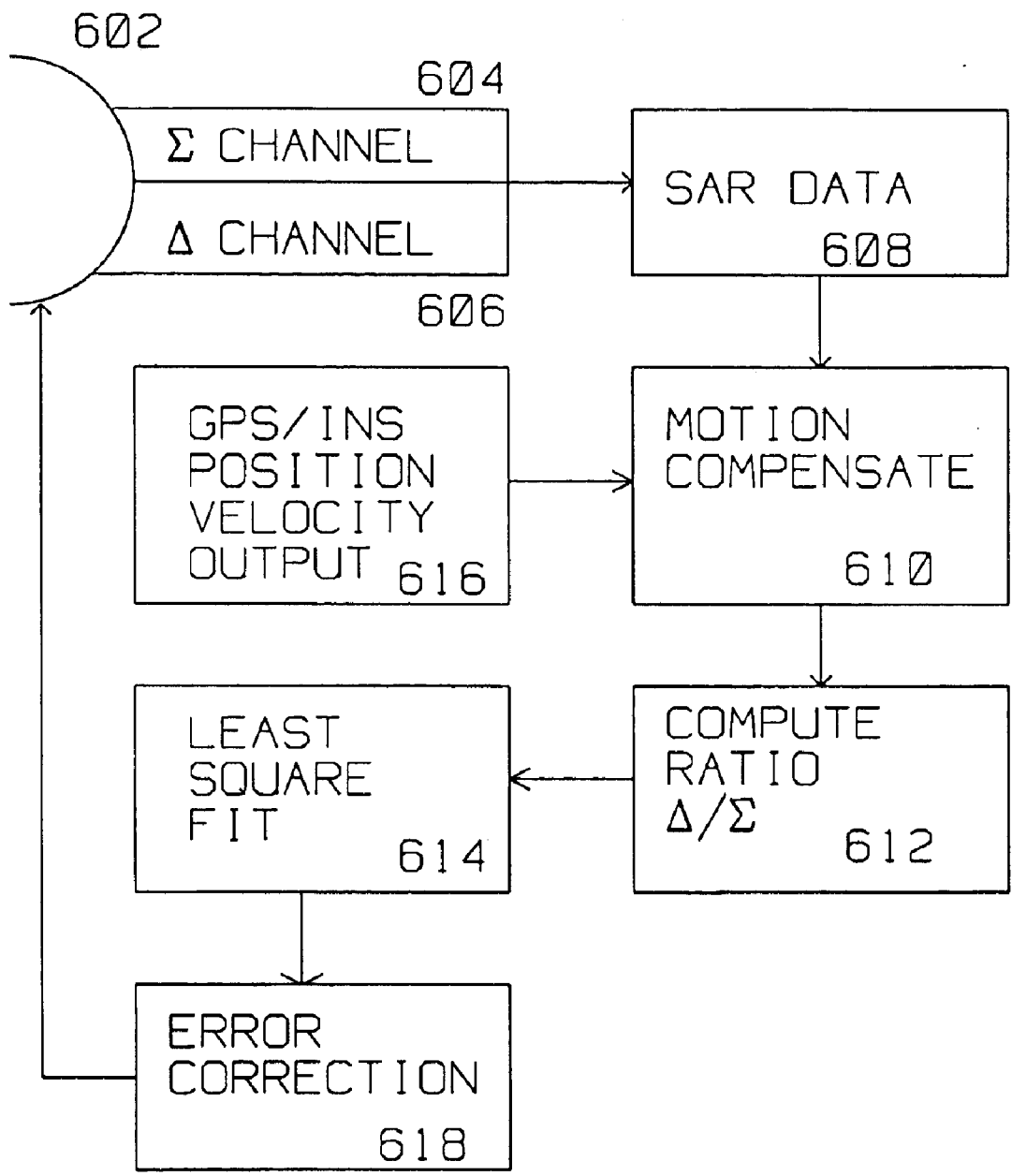
FIG. 6 is an exemplary hardware implementation of this invention.

The typical hardware implementation of above method is shown in FIG. 6. Here, a radar system is deriving a correction for an actual boresight of a radar monopulse antenna 602 mounted on a moving platform from Σ data and Δ data generated with respect to a calibrated boresight of the monopulse antenna. The Σ data is generated from a Σ channel 604, while the Δ data is generated from a Δ channel 606. The monopulse antenna is coupled to a ground position measuring system 616 while acquiring radar data. The ground positioning measuring system reports a position and velocity of the monopulse antenna with respect to a reference.

The radar receiver acquires SAR data 608 from a Σ synthetic aperture map of a radar scattering location using the Σ channel of the monopulse antenna, and a Δ synthetic aperture map of the same radar scattering location using the Δ channel of said monopulse antenna. Both, the Σ synthetic aperture map and the Δ synthetic aperture map are acquired with respect to the calibrated boresight. The Σ synthetic aperture map is formed from a plurality of Σ data, while the Δ synthetic aperture map formed from a plurality of Δ data, as shown in FIG. 4.

A motion compensator, typically a pipeline computer, motion compensate 610, using the ground position measuring system motion compensates the Σ data with respect to the reference and said Δ data with respect to the same reference using the position and velocity from GPS/INS position velocity output 616 to obtain aligned Σ pixels and aligned Δ pixels.

A compute ratio Δ/Σ 612, typically implemented in a computer, forms a ratio of the aligned Δ pixels to the aligned Σ pixels for each of a plurality of aligned Σ pixels located near the calibrated boresight. The computer also computes the correction for the location of the actual boresight of the monopulse antenna by performing a least square fit 614. Least square fit 614 uses the ratios computed in 612 for a plurality of aligned Σ pixels and corresponding aligned Δ pixels over the radar scattering location to identify a line that crosses the Monopulse Angle=0 line. Error E is the difference between where the 0 crossing of the monopulse angle=0 line is found, compared to the calibrated, a priori location of the monopulse. The error E is computed in Error Correction 618, and fed back to monopulse antenna 602 for application to transmission/reception of radar data.

The monopulse antenna is used typically in both elevation and azimuth. When used in elevation, the elevation mapping of the radar scattering location is generally aligned with earth's gravity for an aircraft platform flying straight and level. Similarly, the monopulse antenna can also be used in azimuth. In this case, conceptually identical to the elevation case, the azimuth mapping of the radar scattering location is generally perpendicular to earth's gravity for an aircraft platform flying straight and level. For stabilized antennas, aircraft roll is decoupled from the antenna system, preserving the elevation and azimuth references for aircraft maneuvers within the limits of the stabilization system.

All references cited in this document are incorporated herein in their entirety by reference.

Although presented in exemplary fashion employing specific embodiments, the disclosed structures are not intended to be so limited. For example, although a least square linear fit is shown for identifying the position of the actual boresight, a simple linear fit will also work. Conversely, should a non-linear component of the data warrant it, a non-linear fit can also be used. For example, a parabola may be fit between data points to better estimate the boresight intersection with the zero axis.

The concept described herein is applicable to radar as well as sonar imaging.

Those skilled in the art will also appreciate that numerous changes and modifications could be made to the embodiment described herein without departing in any way from the invention. For example, although a least square fit method is used to identify the line crossing location of the actual boresight, a simple straight line fit can also be used.

What is claimed is:

1. A method for estimating an actual boresight of a radar monopulse antenna mounted on a moving platform from $\Sigma$ data and $\Delta$ data generated with respect to a calibrated boresight of said monopulse antenna, said $\Sigma$ data generated from a $\Sigma$ channel, said $\Delta$ data generated from a $\Delta$ channel, said monopulse antenna coupled to a ground position measuring system, said ground positioning measuring system reporting a position of said monopulse antenna with respect to a reference and a velocity with respect to said reference, said method comprising the steps of:

acquiring a $\Sigma$ synthetic aperture map of a radar scattering location, using said $\Sigma$ channel of said monopulse antenna with respect to said calibrated boresight, said radar scattering location centered about said calibrated boresight, said $\Sigma$ synthetic aperture map formed from $\Sigma$ data;

acquiring a $\Delta$ synthetic aperture map of said radar scattering location using said $\Delta$ channel of said monopulse antenna with respect to said calibrated boresight, said $\Delta$ synthetic aperture map formed from a data;

is motion compensating said $\Sigma$ data with respect to said reference using said position and said velocity to obtain aligned $\Sigma$ pixels;

motion compensating said $\Delta$ data with respect to said reference using said position and said velocity to obtain aligned $\Delta$ pixels, each of said aligned $\Delta$ pixels matched to corresponding said aligned $\Sigma$ pixels obtained from said radar scattering location;

forming a ratio of said aligned $\Delta$ pixels to said aligned $\Sigma$ pixels for each of a plurality of said aligned $\Sigma$ pixels located near said calibrated boresight;

identifying the location of said actual boresight of said monopulse antenna by an analysis of said ratio for a plurality of said aligned $\Sigma$ pixels and corresponding said aligned $\Delta$ pixels over said radar scattering location.

2. A method as described in claim 1 wherein said analysis of said ratio is a least square fit of said plurality of aligned $\Sigma$ pixels around said calibrated boresight.

3. A method as described in claim 2 wherein said plurality of said $\Sigma$ data forming said $\Sigma$ synthetic aperture map is a 512 by 512 matrix centered with respect to said calibrated boresight, and wherein said analysis of said ratio is computed for 20 by 20 said aligned $\Sigma$ pixels around said calibrated boresight to identify said actual boresight.

4. A method as described in claim 3 wherein said ground position measuring system provides said velocity with an accuracy between 1 and 10 millimeters per second, said velocity integrated over time for reporting said position with respect to said reference for motion compensating said $\Sigma$ data and said $\Delta$ data.

5. A method as described in claim 4 wherein said monopulse antenna is used in elevation, said elevation mapping said radar scattering location generally aligned with earth's gravity.

6. A method as described in claim 4 wherein said monopulse antenna is used in azimuth, said azimuth mapping said radar scattering location generally perpendicular to earth's gravity.

7. A radar system deriving a correction for an actual boresight of a radar monopulse antenna mounted on a moving platform from $\Sigma$ data and $\Delta$ data generated with respect to a calibrated boresight of said monopulse antenna, said $\Sigma$ data generated from a $\Sigma$ channel, said $\Delta$ data generated from a $\Delta$ channel, said monopulse antenna coupled to a ground position measuring system, said ground positioning measuring system reporting a position of said monopulse antenna with respect to a reference and a velocity with respect to said reference, said radar system comprising:

a radar receiver for acquiring a $\Sigma$ synthetic aperture map of a radar scattering location using said $\Sigma$ channel of said monopulse antenna, and a $\Delta$ synthetic aperture map of said radar scattering location using said $\Delta$ channel of said monopulse antenna, said $\Sigma$ synthetic aperture map and said $\Delta$ synthetic aperture map acquired with respect to said calibrated boresight, said $\Sigma$ synthetic aperture map formed from $\Sigma$ data, said $\Delta$ synthetic aperture map formed from $\Delta$ data;

motion compensator using said ground position measuring system for motion compensating said $\Sigma$ data with respect to said reference and said $\Delta$ data with respect to said reference using said position and said velocity to obtain aligned $\Sigma$ pixels and aligned $\Delta$ pixels;

computer for forming a ratio of said aligned $\Delta$ pixels to said aligned $\Sigma$ pixels for each of a plurality of said aligned $\Sigma$ pixels located near said calibrated boresight;

said computer also computing said correction for the location of said actual boresight of said monopulse antenna by an analysis of said ratio for a plurality of said aligned $\Sigma$ pixels and corresponding said aligned $\Delta$ pixels over said radar scattering location.

8. A radar as described in claim 7 wherein said analysis of said ratio is a least square fit of said plurality of aligned $\Sigma$ pixels around said calibrated boresight.

9. A radar as described in claim 8 wherein said plurality of said $\Sigma$ data forming said E synthetic aperture map is a 512 by 512 matrix centered with respect to said calibrated boresight, and wherein said analysis of said ratio is computed for 20 by 20 said aligned $\Sigma$ pixels around said calibrated boresight to identify said actual boresight and said correction.

10. A radar as described in claim 9 wherein said ground position measuring system provides said velocity with an accuracy between 1 and 10 millimeters per second, said velocity integrated over time for reporting said position with respect to said reference for motion compensating said $\Sigma$ data and said $\Delta$ data.

11. A radar as described in claim 10 wherein said monopulse antenna is used in elevation, said elevation mapping said radar scattering location generally aligned with earth's gravity.

12. A method as described in claim 10 wherein said monopulse antenna is used in azimuth, said azimuth mapping said radar scattering location generally perpendicular to earth's gravity.

* * * * *